US007913638B2

(12) United States Patent
Olson et al.

(10) Patent No.: US 7,913,638 B2
(45) Date of Patent: Mar. 29, 2011

(54) WASP REPELLENT DEVICE

(75) Inventors: Victoria Olson, Kelowna (CA); Kim Cassar-Torreggiani, Kelowna (CA)

(73) Assignee: Contech Enterprises Inc., Victoria (CA)

( * ) Notice: Subject to any disclaimer, the term of this patent is extended or adjusted under 35 U.S.C. 154(b) by 0 days.

(21) Appl. No.: 12/628,862

(22) Filed: Dec. 1, 2009

(65) Prior Publication Data
US 2010/0071256 A1  Mar. 25, 2010

Related U.S. Application Data

(62) Division of application No. 11/149,149, filed on Jun. 10, 2005, now Pat. No. 7,744,280.

(30) Foreign Application Priority Data

Apr. 12, 2005 (CA) ..................................... 2504396

(51) Int. Cl.
*A01M 29/00* (2006.01)
(52) U.S. Cl. ........................................... 116/1; 116/201
(58) Field of Classification Search ............ 116/1, 22 A, 116/200, 201; 206/457; 43/1, 107
See application file for complete search history.

(56) References Cited

U.S. PATENT DOCUMENTS

| 1,902,368 A | 3/1933 | Johns |
| 2,298,688 A | 10/1942 | Du Pont |
| 2,396,021 A | 3/1946 | Schloss |
| 2,616,467 A | 11/1952 | Cicero |
| D205,772 S | 9/1966 | Blair |
| 3,842,977 A | 10/1974 | Hollander |
| 4,076,121 A | 2/1978 | Clayton et al. |
| 4,873,100 A | 10/1989 | Dirksing et al. |
| 5,226,254 A | 7/1993 | MacMenigall |
| 5,293,975 A | 3/1994 | Howorka |
| 5,346,066 A * | 9/1994 | Jones ........................... 206/457 |
| 5,454,183 A | 10/1995 | Antonini et al. |
| 6,186,662 B1 | 2/2001 | Jackson |
| 6,224,259 B1 | 5/2001 | Guerra |
| 6,394,651 B2 | 5/2002 | Jackson |
| 7,073,942 B2 | 7/2006 | Vazquez |

(Continued)

FOREIGN PATENT DOCUMENTS

JP   11105498 A  *  4/1999

(Continued)

OTHER PUBLICATIONS

Bbum's weblog-o-mat Blog Archive Wasps. Wasps. <http://www.friday.com/bbum/2005/05/05/wasps/>. Printed Oct. 27, 2009.

(Continued)

*Primary Examiner* — R. Alexander Smith
(74) *Attorney, Agent, or Firm* — Oyen Wiggs Green & Mutala LLP

(57) ABSTRACT

According to the present invention, there is provided a wasp repellent device comprising a suspension member operatively connected to a closed end of a bag. The bag has a skirt extending from the closed end of the bag to a mouth of the bag, with a drawstring for contracting the mouth of the bag to give the bag the approximate shape of an inverted cone. The exterior of the bag is provided with a striated pattern and, in use, the bag imitates the appearance of a wasp nest.

3 Claims, 1 Drawing Sheet

U.S. PATENT DOCUMENTS

| | | | |
|---|---|---|---|
| 7,083,331 B2 | 8/2006 | Nykoluk | |
| 7,124,706 B2 * | 10/2006 | Tokas | 119/51.01 |
| 7,744,280 B2 * | 6/2010 | Olson et al. | 383/22 |
| 2008/0263938 A1 * | 10/2008 | Schneidmiller et al. | 43/122 |
| 2010/0269402 A1 * | 10/2010 | Blazer et al. | 43/107 |

FOREIGN PATENT DOCUMENTS

| | | | |
|---|---|---|---|
| JP | 2003023908 A * | 1/2003 | |
| JP | 2004-222576 A | 8/2004 | |
| SU | 1546030 A1 * | 2/1991 | |
| WO | 0243481 A1 | 6/2002 | |

OTHER PUBLICATIONS

Calgary Garden Coach. Garden design for patents and Zone 3(ish) gardeners. Time to put out the paper bag wasp nets. Apr. 17, 2009. <http://calgarygardencoach.typepad.com/calgarygardencoach/2009/04/time-to-put-out-the-paper-bag-wasp-nests.html>.

Murphy, Lizzie. "The Medieval Idea to Take the Sting out of Summer", Yorkshire Post. Jan. 24, 2008.

Paper Bag Wasp Nests—Ontario Nature Discussion Form. Ask the Naturalist. <http://www.ontarionature.org/ubb/Formu7/HTML/000046.html> Printed Oct. 27, 2009.

* cited by examiner

WASP REPELLENT DEVICE

BACKGROUND OF THE INVENTION

1. Field of the Invention

The present invention relates to a wasp repellent device.

2. Description of the Related Art

Wasps are often attracted to kitchens, rooms and other indoor locations and to tents, picnics or other outdoor locations in search of food, thereby becoming a nuisance to the people in those locations. It is therefore desirable to be able to repel wasps from such locations. It is accordingly an object of this invention to provide a novel and improved wasp repellent device.

BRIEF SUMMARY OF THE INVENTION

According to the present invention, there is provided a wasp repellent device, comprising a bag comprising a first end defining a mouth of the bag and a second end opposite from the first end, the second end being closed; and a suspension member operatively connected to the second end at the exterior of the bag.

In use, the bag can be suspended by the suspension member, with the bag inverted, so that the bag imitates the appearance of a wasp nest and therefore serves to repel wasps from the vicinity of the bag.

Also according to the present invention, there is provided a wasp repellent device, comprising a polypropylene bag having a first end defining a bag mouth, a second, closed end opposite from the first end and a skirt between the first and second ends, the bag having a striated pattern applied to the exterior of the bag, a suspension member operatively connected to the second end of the bag at the exterior of the bag, and a closing member adjustable for contracting the mouth of the bag.

The closing member, in a preferred embodiment of the present invention, comprises a drawstring by means of which the mouth of the bag can be constricted to give the bag the approximate appearance of an inverted cone, as an imitation wasp nest.

BRIEF DESCRIPTION OF THE DRAWINGS

The invention will be more readily understood from the following description of an embodiment thereof given, by way of example only, with reference to the accompanying drawings, in which.

DESCRIPTION OF THE PREFERRED EMBODIMENT

Figure 1:
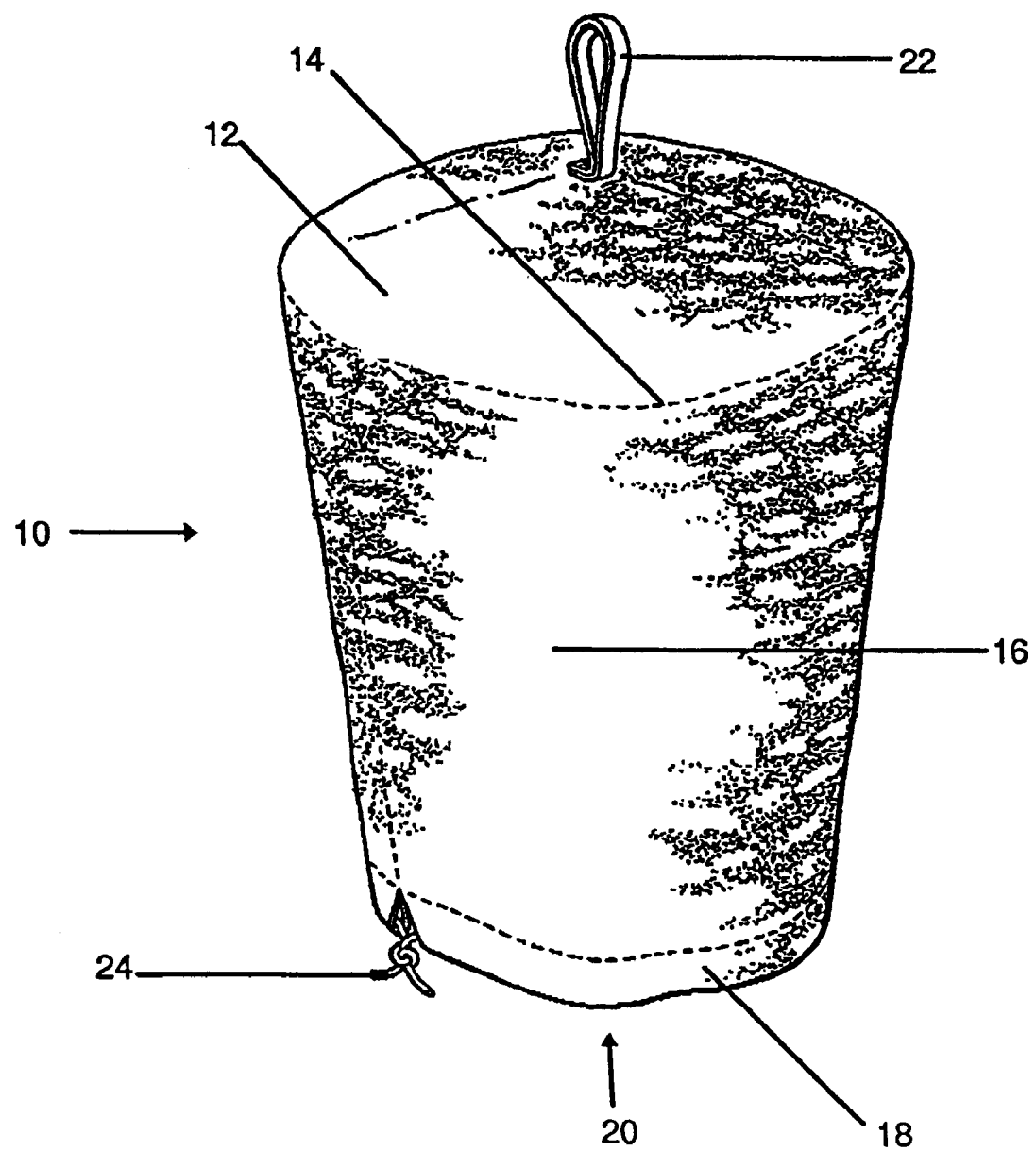
FIG. 1 is a perspective view showing a wasp repellent device according to an embodiment of the invention.

Referring to the drawing, there is shown an wasp repellent device in the form of a polypropylene bag indicated generally by reference numeral 10, which has a striated pattern printed on the exterior of the bag 10.

The bag 10 comprises, at one end of the bag 10, a circular bag portion 12 which is secured by a ring of stitching 14 to a skirt 16. At the end of the bag 10 opposite from the closed portion 12, the skirt 16 is provided with a seam 18 around a bag mouth indicated generally by reference numeral 20.

In this embodiment of the invention, the exterior of the bag 10 is printed with a striated pattern with contrasting shades of grey. However, other means of striating the bag 10 may substituted. By way of example only, differences in texture may be used to striate the bag 10.

A suspension member in the form of a polypropylene loop 22 is operatively connected by stitching to the closed portion 12 and when the bag is in use serves to suspend the bag 10 from, for example, an overhead hook or the like (not shown). In this embodiment of the invention, the suspension member is formed as the loop 22, which is stitched to the closed portion 12. However, other suitable means for suspending the bag 10 may be substituted. By way of example only, a hook may be secured to the bag.

A closing member in the form of a drawstring 24 is operatively connected to the bag 10 by being threaded through the seam 18. The drawstring 24 can be pulled to contract the mouth of the bag in a manner such that the seam 18 of the bag 10 is drawn towards a central point, thereby forming the inverted bag into the approximate shape of a wasp's nest. In this embodiment of the invention, the drawstring 24 is provided as the closing member and the drawstring 24 may comprise a toggle (not shown). However, other suitable means for closing the mouth of the bag may be substituted.

The bag 10 functions as follows:

The bag 10 is suspended by means of the polypropylene loop 22 in a location from which it is desired to repel wasps and the mouth of the bag 10 is contracted by means of the drawstring 24, so that the bag 10 assumes the approximate inverted cone shape in imitation of a wasp nest, as mentioned above. The skirt 16 of the bag 10 may be adjusted manually to configure the bag 10 into the desired shaped. Wasps then perceive the inverted bag 10 to be an enemy hest and avoid the area.

As will be apparent to those skilled in the art, various modifications may be made in the above-described embodiment of the present invention within the scope of the appended claims.

The invention claimed is:

1. A method of deterring wasps, comprising the steps of:
   (a) providing a nest mimic comprising a first end defining a mouth of the nest mimic and a second end opposite from the first end, the second end being closed, and a suspension member operatively connected to the second end at an exterior of the bag nest mimic;
   (b) suspending the nest mimic by the suspension member in a location from which it is desired to repel wasps; and
   (c) configuring the nest mimic into a shape in imitation of a wasp nest.

2. A method according to claim 1, wherein step (c) comprises closing the mouth of the nest mimic.

3. A method according to claim 2, wherein step (c) further comprises manually adjusting a skirt of the nest mimic.

* * * * *